(12) United States Patent
Viaud et al.

(10) Patent No.: US 7,055,425 B2
(45) Date of Patent: Jun. 6, 2006

(54) LARGE ROUND BALER

(75) Inventors: Jean Viaud, Gray (FR); Sebastien Guillemot, Gray (FR); Daniel Derscheid, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/926,187

(22) Filed: Aug. 25, 2004

(65) Prior Publication Data

US 2005/0045051 A1   Mar. 3, 2005

(30) Foreign Application Priority Data

Aug. 28, 2003   (DE) ................... 103 39 652

(51) Int. Cl.
*B30B 5/04*      (2006.01)
*A01D 39/00*    (2006.01)
(52) U.S. Cl. ..................... 100/88; 100/87; 100/89; 100/100; 56/341; 56/344; 414/24.5
(58) Field of Classification Search ............ 100/5, 100/48, 87, 88, 89, 100; 56/341, 344, 345, 56/346, 350; 414/24.5, 24.6, 111, 551, 911
See application file for complete search history.

(56) References Cited

U.S. PATENT DOCUMENTS

| | | | |
|---|---|---|---|
| 3,925,974 A | 12/1975 | Bartlett | 56/346 |
| 4,062,172 A * | 12/1977 | Rice et al. | 56/343 |
| 4,262,478 A | 4/1981 | Pentith | |
| 4,667,592 A * | 5/1987 | Pentith et al. | 100/88 |
| 5,913,805 A | 6/1999 | Vodon | |
| 6,240,712 B1 * | 6/2001 | Meijer | 56/16.4 R |
| 6,520,072 B1 | 2/2003 | Chedru et al. | 100/35 |
| 2002/0121200 A1 | 9/2002 | Viaud | |

FOREIGN PATENT DOCUMENTS

| | | |
|---|---|---|
| DE | 43 15 347 | 5/1993 |
| DE | 101 07 625 | 8/2002 |
| DE | 10250425 | 10/2002 |
| EP | 0 161 726 | 11/1985 |
| EP | 1 264 531 | 6/2001 |
| EP | 1308078 | 9/2002 |
| GB | 2 152 873 | 8/1985 |
| WO | WO 02/083401 | 10/2002 |

\* cited by examiner

*Primary Examiner*—Derris H. Banks
*Assistant Examiner*—Jimmy Nguyen

(57) ABSTRACT

A large round baler comprises a baling chamber and a door that is arranged in the rear area of the baling chamber and includes a pair of wings mounted to opposite sides of the baler so that each is displaceable about an upright pivot axis between a closed position, in which the wings extend inwardly along the rear of the baling chamber, and an open position, in which a passage is defined through which a finished bale can pass after being ejected from the baling chamber. The baler may be of a type including a carrier for bale-forming devices that can be displaced in the baling chamber, independently from the door, between a bale-forming position and a bale ejection position, and that the door, when closed, blocks direct access to the carrier and the devices for forming the bale.

10 Claims, 5 Drawing Sheets

LARGE ROUND BALER

FIELD OF THE INVENTION

The invention relates to a round baler comprising a baling chamber and a door that is arranged in the rear area of the baling chamber and is displaceable about a pivot between a closed position, in which the door extends along the rear of the baling chamber, and an open position, in which a finished bale can be ejected from the baling chamber.

BACKGROUND OF THE INVENTION

Round balers are used to turn agricultural harvested crops into bales. Such round balers comprise a baling chamber and corresponding pressing devices. Upon completion of a bale, in conventional round balers a rear door swivels upward to eject the bale.

In order to achieve that the bale reaches the door from the swivel area so that the door can be closed again as quickly as possible, so-called discharge devices are known, which move the bale away from the pivot area of the door. It has been suggested (DE 43 15 374 C) to equip such a discharge device with a hold-back device, which prevents the bale from rolling too far away from the round baler, for example, down a hill. These devices are additional elements, which increase the weight of the round baler and make its manufacture more complex and expensive.

Other designs of round balers have been suggested (EP 1 308 078 A), comprising a carrier that fastens elements, which support the belt-shaped pressing device in the lower region of the baling chamber of the round baler. The carrier can pivot between said bale-forming position and a bale ejection position, in which it is swiveled backward and upward and releases an opening on the rear of the baling press. On such round balers, movable elements, for example the pressing devices, can be found in the rear area during operation. From an occupational safety aspect these round balers are therefore questionable.

The subsequently published document DE 102 50 425 A suggests to install a rear guard in form of a shield or similar mobile fittings on such a round baler.

The problem on which the invention is based is to provide a round baler, which does not exhibit the above-described disadvantages or to a lesser degree.

SUMMARY OF THE INVENTION

According to the present invention, there is provided an improved discharge door arrangement for a large round baler.

An object of the invention is to provide a large round baler having a discharge door which pivots about an upright axis when moving between a closed position during bale formation and an open position for bale discharge.

It is suggested to install a door on the rear of the baling chamber of the round baler, wherein said door can swivel about a vertical or substantially vertical pivot. The door is not dependent on the pressing devices of the baling chamber since the latter are generally swiveled upward to release the baling chamber to the rear for ejection of a bale. Due to the vertical arrangement of the pivot the door can be opened and closed without great efforts and hence without large and expensive drives.

Alternatively or in addition it is suggested to equip the baling press with a carrier, which carries devices for bale-forming purposes in the baling chamber and which is displaceable between a bale-forming position and a bale ejection position, and to design the door such that it can be moved independently from the carrier. In a baling press, in which the bale-forming devices that move during operation would otherwise be exposed openly to the rear, this way a rear guard is achieved to improve occupational safety.

Since the door can move independently from the carrier, it can be displaced in any random direction and can in particular swivel about a vertical axis.

In a preferred embodiment the door serves as a retention device for the bale. It comes into contact with the ejected bale at its front and slows it down. This way it can be prevented that the bale moves too far away from the round baler. In order to prevent undesirable wear of the door, it is conceivable to equip the end region of the door resting against the bale with rotational elements, which can move freely or can be slowed down.

As a rule the door comprises two leaves, between which the bale is ejected. It can therefore be slowed down on both sides, avoiding undesirable rotational movements of the bale about the vertical axis. Embodiments with only a single door however are conceivable as well.

The door is preferably pre-stressed in the closed position, which can occur by means of weights and/or springs. This also leads to a defined lateral force on the ejected bale, which suffices to slow it down safely. It may however also be advisable to move the door additionally or exclusively by means of a power (hydraulic, pneumatic or electric) drive. In a preferred embodiment the power drive moves the door into an intermediate position between the closed and open positions. From said position it can be opened further—for example by the discharged bale—against the pre-stress. To this end it is possible to provide a coupling between the drive and the door, which allows a free relative movement between the drive and the door over a specific angle range of the door movement.

The power drive can be synchronized with the movement of the carrier in order to achieve a useful time progression of the movements. Another benefit of such a drive consists of the fact that it is possible to rotate the two wings of a door at different angles. This allows also the bale to be rotated in a specific, desired direction, for example in order to prevent it from rolling down a hill.

BRIEF DESCRIPTION OF THE DRAWINGS

The drawing shows an exemplary embodiment of the invention, which is described in more detail in the following. It shows.

DESCRIPTION OF THE PREFERRED EMBODIMENT

Figure 1:
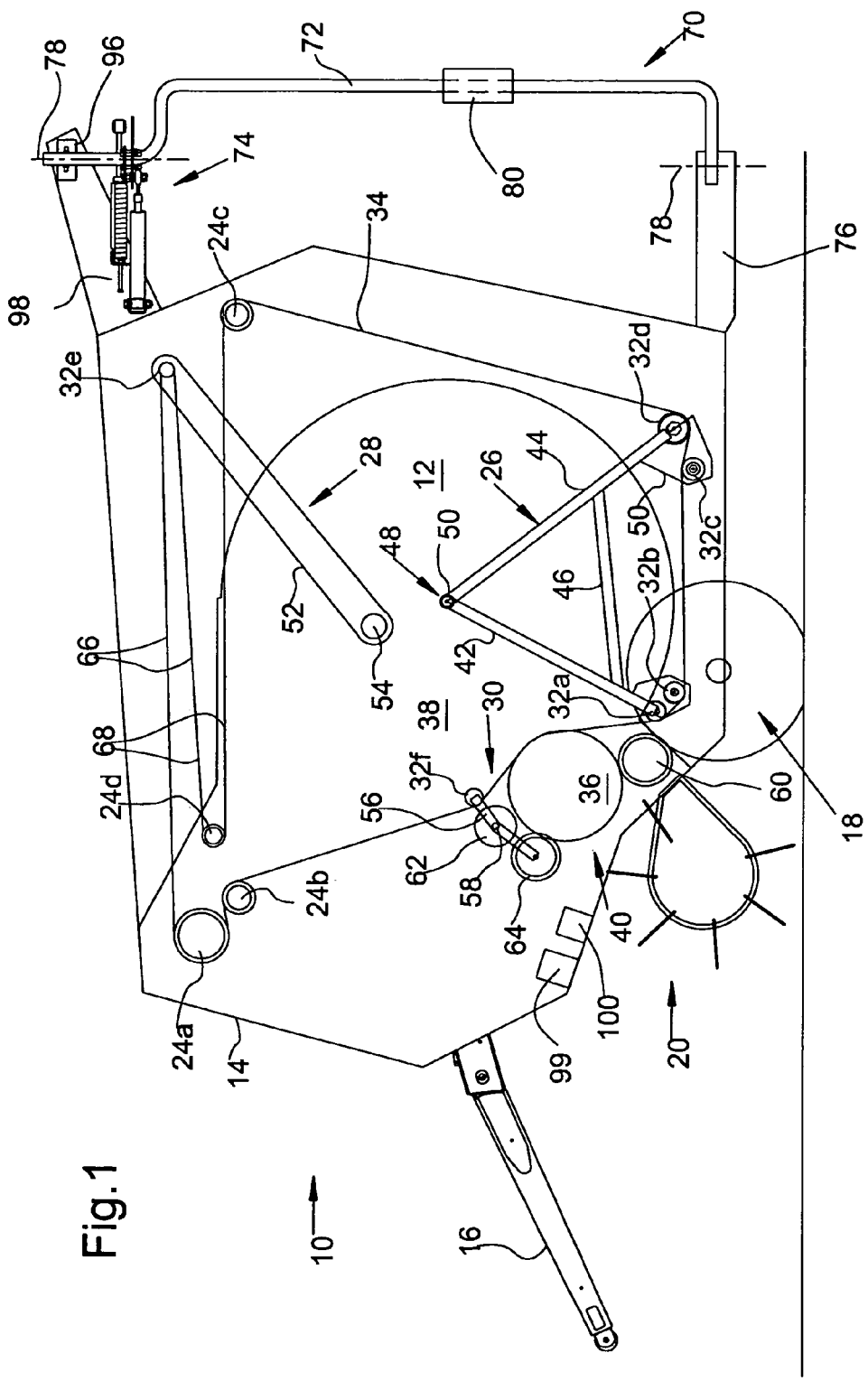
FIG. 1 is a schematic left side view of a large round baler, constructed in accordance with the principles of the present invention, shown in a slightly filled operating state.

FIG. 1 shows one embodiment of a round baler 10 comprising a frame 14, which is supported on the ground by a wheel assembly 18. On the front of the frame 14, a tow bar 16 is arranged in order to attach the round baler 10 to a tractor used for towing the baler 10 across a field. A crop receiving device 20 in form of a pick-up device serves to pick up harvested crop from the ground, e.g., a windrow of hay or straw. The harvested crop that is picked up by the receiving device 20 is fed to the entrance of a baling chamber 12 and rolled there in a spiral shape into a cylindrical bale 36, is tied up and subsequently placed on the ground.

A lower, stationary roller 60 and two upper rollers 62, 64 delimit an crop inlet or 40 of the baling chamber 12. The baling chamber 12 is furthermore formed by an endless bale-forming device 34 defined by a belt arrangement, which is guided around a number of fixed rotary elements 24a–d and movable rotary elements 32a–f. Thus, the periphery of the baling chamber 12 is essentially surrounded by the bale-forming device 34, it is closed off laterally by side walls 38.

Four of the rotary elements 32a, 32b, 32c and 32d can each pivot freely in pairs at the end of a delta- or triangular-shaped carrier 26, having opposite sides which each comprise a first leg 42 and a second leg 44, which are connected to each other by means of a strut 46. The first and the second legs 42 and 44 of each side of the carrier 26 join in a bearing 48, which is seated on a bearing part 50 on the outside of a respective one of the side walls 38. The bearing part 50 is located directly in or close to the center of the baling chamber 12 and/or the side wall 38.

Figure 3:
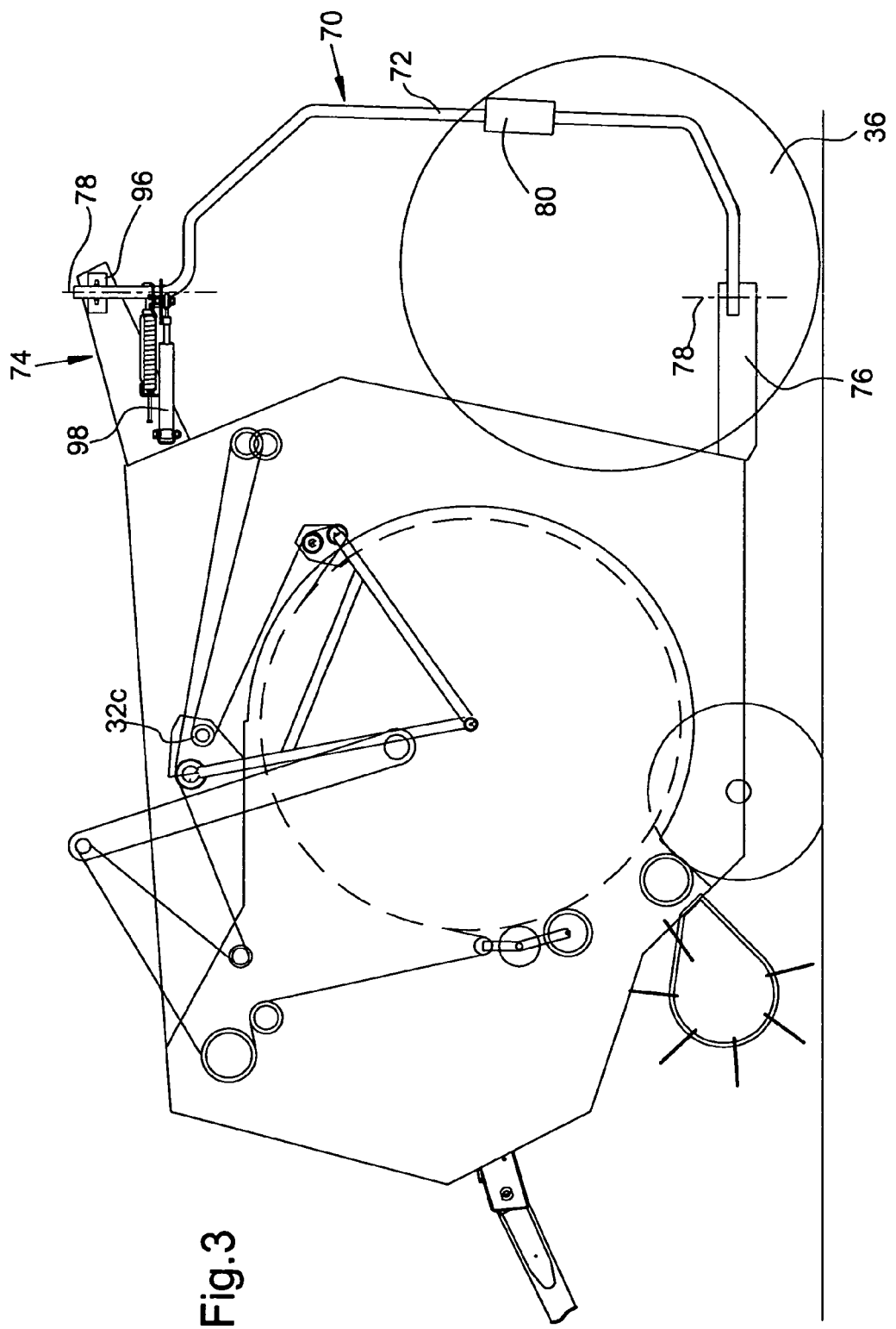
FIG. 3 is a view of the round baler from FIG. 1 shown during the discharge operation.

Adjustment of the carrier 26 occurs by means of a not depicted actuator, e.g. a hydraulic cylinder, a rotating hydraulic motor with a gear or an electric or pneumatic motor. The carrier 26 can swivel between two end positions, namely a lower position, as shown in FIG. 1, in which the rotary elements 32a through 32d are located substantially close to a horizontal plane beneath the baling chamber 12, and a position that is offset upwardly by nearly 180 degrees thereto, as shown in FIG. 3, in which the rotary elements 32c, 32d of the second leg 44 rest between the intermediate and the rear fixed rotary elements 24d and 24c.

A tensioning mechanism 28, for the purpose of tightening the endless belts of the bale-forming device 34, comprises a tensioning arm 52 mounted, as by respective bearings 54, at each side wall 38 of the baling chamber 12 for swinging vertically. A rotary element 32e is mounted on a radially outer end of each arm 52 and its counterclockwise movement about the axis of the bearing 54 is resisted by a tensioning element, which is not shown. The bearings 54 of the tensioning arms 52 are respectively located in the areas of the side walls 38 above and in front of the bearing parts 50 and below the plane about which the fixed upper rotary elements 24a–d are arranged. The tensioning element is designed in the usual fashion as a mechanical spring or as a hydraulic motor, which can be displaced against a possibly modifiable resistance. Such a resistance can be produced by means of a preferably adjustable throttle in a hydraulic circuit, as is known in general. The degree of resistance at the same time determines the density and the maximum weight of the bale 36.

The rollers 62, 64, bordering the upper side of the inlet 40, and the rotary element 32f are attached to a swiveling carrier 30, which comprises a frame 56 that can swivel vertically in its central region about a pivot 58. The rotary element 32f and the rollers 62, 64 can pivot freely in the frame 56, wherein the roller 62 runs coaxially to the pivot 58. The frame 56 can be pre-stressed to a specific position by means of a tensioning element.

The bale-forming device 34, among other things, runs across the fixed rotary elements 24a–d and across the movable rotary elements 32a–f and is placed against at least one rotatably driven fixed rotary element 24a–d by means of the tensioning mechanism 28 such that it can be caught safely. The bale-forming device 34 assumes a starting position, in which it bridges the entrance 40 in a barely stretched manner, and an end position, in which it wraps around the bale 36 like a large loop. The baling chamber 12 therefore has a variable size, i.e., its diameter increases with the size of the bale 36. During its production, the bale 36 is located in the baling chamber 12 and largely wrapped by the bale-forming device 34, but it drops out of the baling chamber 12, i.e. the chamber between the side walls 38, onto the ground as soon as the carrier 26 with the movable rotary elements 32 swivels upward counter-clockwise, looking at the drawing.

The side walls 38 could be mounted for being displaced transversely to the driving direction so that upon ejection of the bale 36 they reduce the contact pressure between opposite ends of the bale and inner surfaces of the side walls 36, allowing the bale 36 to exit more easily and hence more quickly. It would, for example, suffice if the side walls 38 were able to move apart a few centimeters from each other. The side walls 38, while shown fixed in this application, could be designed for moving with the carriers 26.

The function of the round baler 10 is as follows: As long as the round baler 10 is not fed any harvested crop and the baling chamber 12 is empty, the carrier 26 is located in its lower, front end position, in which the first, front rotary element 32a, which is carried by the lower end of the first leg 42, is disposed close to the roller 60 and the rotary elements 32a–32d are located close to a substantially horizontal plane. The tensioning arm 52 will, at that point, be pushed to the rear, while the pivoting carrier 30 assumes its farthest possible counter-clockwise end position. A section of the bale-forming device 34 extends across the insides of the rollers 60 and 64 and closes the entrance 40. This state is shown in FIG. 1.

As soon as harvested crop is conveyed into the baling chamber 12 via the receiving device 20, it will lead to an excursion of the section of the bale-forming device 34 towards the inside of the baling chamber 12, causing the tensioning arm 52 to begin its forward movement in order to shorten loops 66, 68 formed by the bale-forming device 34 in the upper region of the round baler 10. As the bale 36 grows in diameter, the tension in the bale-forming device 34 will act against the rotary element 32f and will cause the carrier 30 to pivot counterclockwise about the pivot axis 58. This moves the roller 64 to the rear so as to force the bale 36 away from the entrance 40 so that the arriving harvested crop can be easily received. While the bale diameter increases, the carrier 26 remains in its position illustrated in FIGS. 1 and 2.

Figure 2:
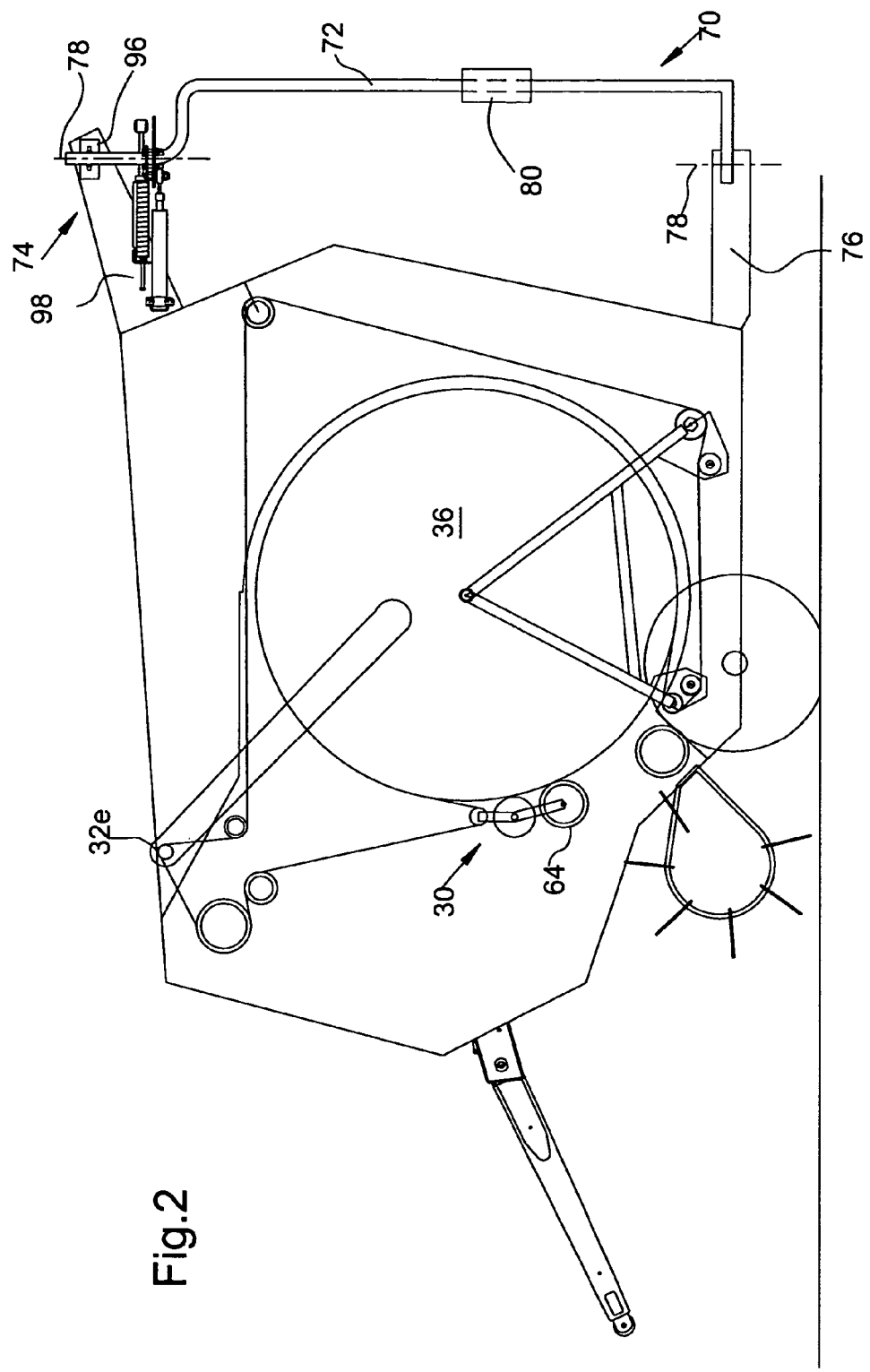
FIG. 2 is a view of the round baler from FIG. 1 shown in a filled state.

When the bale 36 has reached its largest diameter (see FIG. 3), the swiveling carrier 30 will have reached its maximum counter-clockwise position and the tensioning arm 52 will have assumed its front position, in which the first loop 66 has its shortest length (see FIG. 2). Although shown slightly separated from them, the bale 36 rests on the front of the roller 60 and the adjoining first rotary element 32a. However, the tension in the bale-forming device 34 does keep the bale 36 from coming into contact with the first and the second rotary elements 32c, 32d and the belt sections running across them. If needed, another, not depicted roller can be provided between the two second legs 44 for providing support for the bale 36. When the bale 36 has reached its maximum size, the radial offset of the first and second rotary elements 32a and 32b on the first leg 42 prevents the adjacent sections of the bale-forming device 34 from resting against each other. In this state, the bale 36 can be tied or wrapped with a film or net so that it does not fall apart when leaving the baling chamber 12.

After the bale 36 has been completed, it can be ejected from the baling chamber 12, for which purpose the carrier 26 is swiveled back and upward counter-clockwise. Especially due to the carrier 26 being pivotally coupled to location in or close to the center of the side walls 38, the bale 36 will drop to the ground after only a short swivel path of the carrier 26 of, for example, about 90 degrees. After the carrier 26 pivots counterclockwise about 180 degrees, the first rotary element 32a is located on the first leg 42 so far above the ground that the round baler 10 can travel further forward without hitting the bale 36.

As soon as the bale 36 has rolled out of the baling chamber 12, the carrier 26 is swiveled again downward into the position shown in FIG. 1. This tensions the bale-forming device 34 again, and the tensioning arm 52 is moved again to the back.

The illustrated embodiment of the baler is disclosed in detail in EP 1 308 078 A. Other possible embodiments are described in DE 198 51 470 A, DE 102 41 215 A and EP 1 264 531 A. The disclosed content of these documents is included by means of reference in the present invention.

Figure 4:
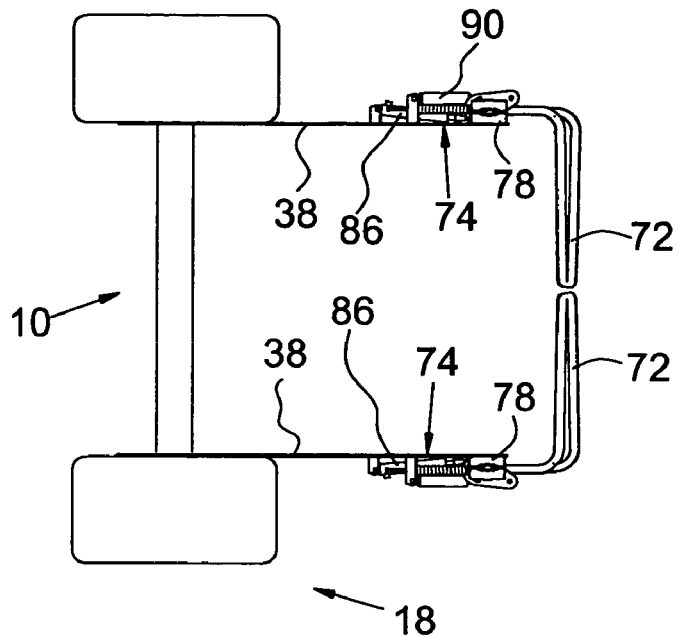
FIG. 4 is a top view of the round baler shown during formation of a bale.
Figure 5:
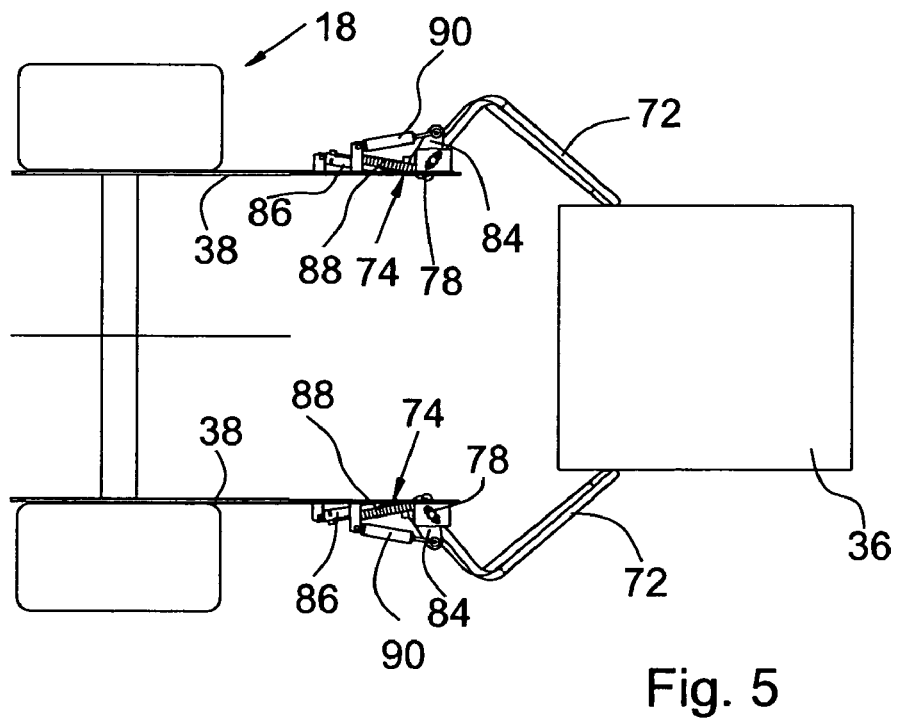
FIG. 5 is a top view of the round baler shown after discharge of a bale.

Based on FIGS. 1 through 3 it is evident that the round baler 10 is open to the back so that the finished bale 36 can be ejected. The bale-forming devices 34, which move during operation, are hence freely accessible in the rear area of the round baler 10, which is not beneficial from an occupational safety aspect. In order to improve the latter, a door 70 is arranged on the rear of the round baler 10. The door 70, as is illustrated in FIGS. 4 and 5, comprises two wings 72, which are composed of pipes. Respectively associated with the two wings 72 are two swiveling devices 74 respectively mounted to upper rear locations at opposite sides of the baler 10. Each of the wings 72 extends, in its closed position, initially downward from an associated one of the two swiveling devices 74, then to the back and inside, then again downward and finally forward up to a lower swiveling device 76. The wings 72 at each side of the baler 10 are linked to the upper and lower swiveling devices 74 and 76, respectively, so as to be able to pivot about a vertical, pivot axis 78. This is accomplished through bearing arrangements 96, which are arranged between arms 98 connected to the round baler 10 and the wings 72. The lower swiveling devices 76 are simple bearing arrangements, which correspond to the bearing arrangements 96 in their design and function.

When forming the bale 36, the doors 70 are located in the closed position, as illustrated in FIG. 4. When the bale 36 is discharged, the doors 70 transition into the open position, as is illustrated in FIG. 5, in which the wings 72 are swiveled outward. During ejection of the bale 36, elements 80 in the form of cylinders mounted for turning freely, or in a sloweddown fashion, on vertically extending sections of the wings 72, initially rest against the front of the bale 36

The door 70, on one hand, provides a shield to the carrier 26 and the bale-forming device 34 during production of the bale 36, on the other hand it has a braking effect during ejection of the bale 36. It therefore serves as a retention device, which prevents the bale 36 from rolling too far away from the round baler 10 or even for example down a hill. The shielding effect of the doors moreover eliminates the necessity to swivel the carrier 26 relatively slowly for occupational safety reasons. To improve the shielding effect of the door 70, the wings 72 could be supplemented with sheets, fabrics or the like. The wings 72 can consist of metal or non-metallic material. Instead of round pipes, as is shown in the drawings, cornered pipes, plates and/or sheets can be used as well.

Figure 8:
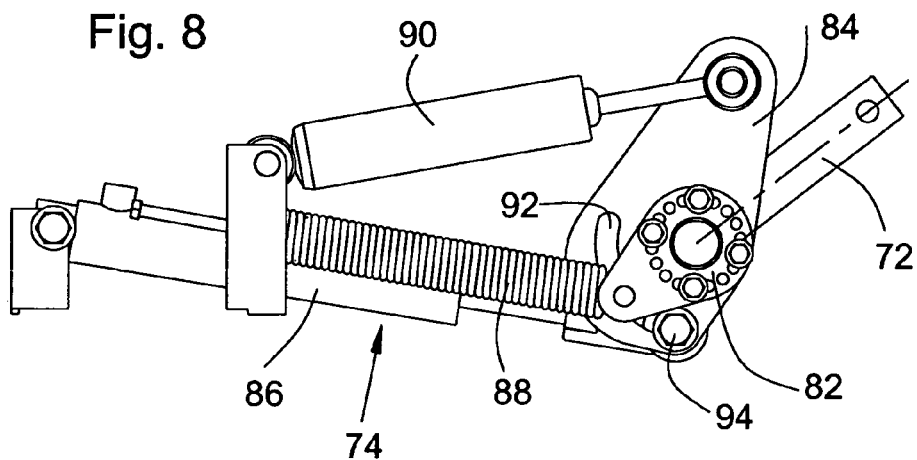
FIG. 8 is a top view of the swiveling device of the door shown in an open position.
Figure 7:
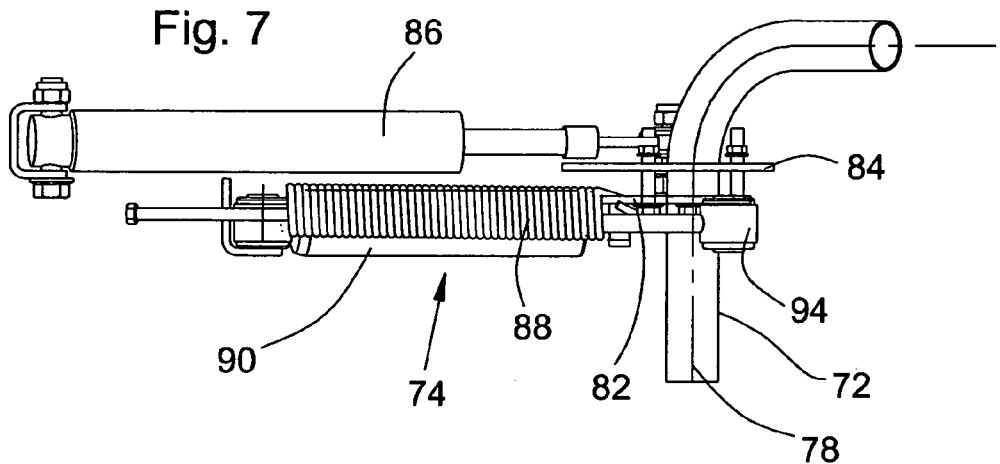
FIG. 7 is a side view of the door swiveling device.
Figure 6:
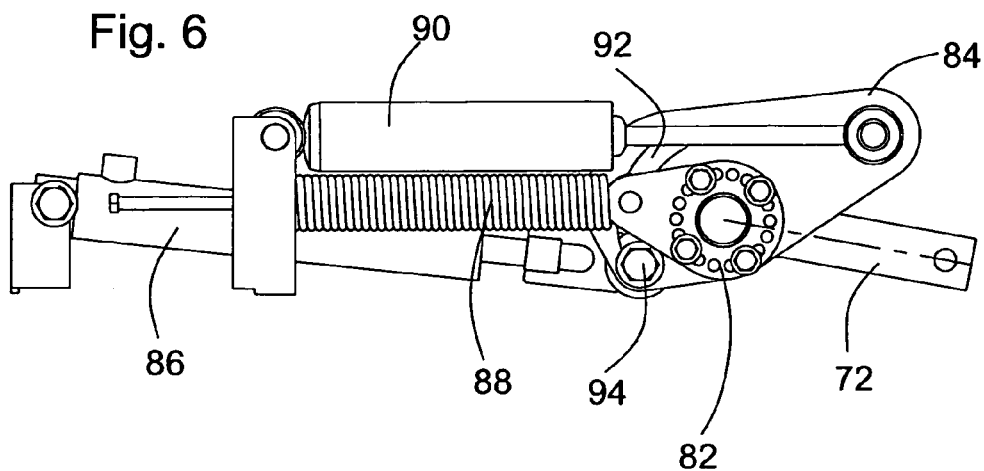
FIG. 6 is a top view of a swiveling device of the door shown in a closed position.

The FIGS. 6 through 8 show detailed views of the swiveling device 74. Each figure shows the upper swiveling device 74 illustrated in FIGS. 4 and 5 (the right one in the driving direction of the round baler 10), which has assumed the closed position in FIG. 6 and the open position in FIGS. 7 and 8. Based on these figures, it is evident that the wings 72 on the upper swiveling device 74 are each attached to a swiveling plate 84 with a flange 82 and screw bolts. The swiveling plate 84 and the flange 82 can rotate jointly with the leaf 72 about the pivot axis 78. To the swiveling plate 84, a pin 94 is connected in an arcuate opening 92 formed at a radius about the axis 78, wherein the pin 94 is connected to a first end of a drive 86 in form of a double-action hydraulic cylinder. The drive 86 is linked to the side wall 38 with its other end. Additionally, a spring 88 extends between the flange 82 and the side wall 38. Moreover a gas spring 90 is connected between the swiveling plate 84 and the side wall 38. The spring 88 pre-stresses the leaf 72 in the closed position. The gas spring 90 ensures a vibration dampening effect. The drives 86 enable an active opening and closing of the door 70. Since the drive 86 is coupled via the pin 94 and the arcuate opening 92 to the swiveling plate 84, undesirable damage to the leaf 72 is prevented in case a bale 36 should still be located between the wings 72 when closing the door 70. It should be noted that the wings 72 are supported on the arms 98 by the bearing arrangements 96, see FIG. 1.

The drives 86 are actuated by an electro-hydraulic control device 99. The latter also controls the movement of the carrier 26 so that the control unit can initiate the movements of the door 70 and the carrier 26 in a time-coordinated sequence. After swiveling the carrier 26 upward, the door 70 is brought by means of the drives 86 into a slightly open position (generally as soon as it is located roughly in the middle between the bale-forming position and the bale ejection position), in which it is located roughly in the middle between the positions illustrated in FIGS. 4 and 5. The ejected bale 36 moves the wings 72 outward against the force of the springs 88, wherein the pin 94 moves in relation to the arcuate opening 92 since the drive 86 then remains stationary. The bale 36 is then slowed down by the wings 72 and comes to a halt. Thereafter the control device 99 returns the carrier 26 into the bale-forming position. Independent hereof the drive 86 can be retracted again as soon as (for example based on a time period that has passed or based on the signal of a suitable sensor) it can be assumed that the bale 36 has come to a halt. Shortly before reaching the closed position, the movement of the door 70 is preferably slowed down in order to reduce the risk of an accident.

The braking effect of the door 70 on the bale 36 has the advantage that an undesirable rolling away of the bale 36 is prevented. This is useful in particular on a hill. In this case, it may be useful to bring the bale 36 into an angled position in relation to the driving direction of the round baler 10 so that it is aligned transversely to the direction of the hill gradient and cannot roll down the hill. For this purpose the drives 86 can bring the wings 72 of the door 70 into respectively different positions. The control device 99 is hence equipped to actuate the two drives 86 differently. Moreover it is connected to an inclination sensor 100 in form of a pendulum or the like in order to be able to actuate the drives 86 in a suitable fashion. Information about the hill incline can also be deduced from the signals of a satellite antenna of a position determination system of the tractor.

Having described the preferred embodiment, it will become apparent that various modifications can be made without departing from the scope of the invention as defined in the accompanying claims.

The invention claimed is:

1. A large round baler, comprising: a mobile chassis; a bale-forming chamber carried by said chassis and a carrier structure supporting bale-forming devices and movable between a lowered, bale-forming position and a raised bale discharge position; and a door mounted to a rear of said baler for movement between a closed position, wherein said door spans a zone extending transversely behind said baler so as to prevent direct access to said carrier structure and so as to be positioned for intercepting a discharged bale, and an open position wherein said door permits relative movement between the baler and the bale and wherein said door includes two wings respectively mounted to opposite sides of said baler for pivoting about respective upright axes, with said closed position occurring when said wings each project transversely approximately half-way across a space rearward of said baler, and with said open position occurring when said wings each project rearwardly so as to define an open passage between them.

2. The large round baler, as defined in claim 1, wherein each of said wings, as considered in its closed position, has a rotational element mounted to an inner end thereof for being engaged by a discharged bale.

3. The large round baler, as defined in claim 1, wherein said door is moveable independently of said carrier structure.

4. The large round baler, as defined in claim 1, wherein a biasing device is coupled to said door which operates to bias said door to said closed position.

5. The large round baler, as defined in claim 1, wherein a remotely operable drive is coupled to said door for selectively moving said door between said open and closed positions.

6. The large round baler, as defined in claim 1, wherein a remotely operable drive is coupled to said at least one wing of said door; said remotely operable drive being selectively operable for moving said door to a position intermediate said open and closed position; a biasing device coupled for resisting movement of said at least one wing from said closed position; and said remotely operable drive being operable for moving said at least one wing against said biasing device from said intermediate position to said open position.

7. The large round baler, as defined in claim 1, wherein a pair of drive devices are respectively provided for selectively moving said two wings between their open and closed positions; a further drive being coupled to said carrier, and a controller being coupled to said pair of drive devices and to said further drive device for effecting synchronous control of said carrier and said door.

8. The large round baler, as defined in claim 1, wherein a pair of drive devices are respectively coupled to said two wings; and said pair of drive devices being operable independently of each other so as to selectively effect movement of said wings through different pivot angles.

9. The large round baler, as defined in claim 8, wherein a controller is coupled to said pair of drive devices; a slope sensor being coupled to said controller for inputting a signal corresponding to a slope of terrain on which the baler is operating; and the amount of pivoting of each of said wings depending on the sensed slope.

10. The large round baler, as defined in claim 8, wherein a controller is coupled to said pair of drive devices; and said controller operating to control said drive devices so that during closing the wings of said door are moved slower at an end range of their movement.

* * * * *